United States Patent Office 3,522,243
Patented July 28, 1970

3,522,243
OMEGA-AMINO 1-ALKYNYL STEROIDS AND
REDUCTION PRODUCTS THEREOF
Robert G. Christiansen, Schodack, and Raymond O. Clinton, East Greenbush, N.Y., assignors to Sterling Drug Inc., New York, N.Y., a corporation of Delaware
No Drawing. Filed Mar. 17, 1964, Ser. No. 352,674
Int. Cl. C07c *173/10, 169/20*
U.S. Cl. 260—239.5           35 Claims This invention relates to basic steroids and in particular it is concerned with steroids substituted by omega-amino-1-alkynyl and reduction products thereof.

The inventive concept herein resides in a molecular configuration wherein a steroid moiety is substituted at the 3-position and/or 17-position (17a-position in the case of D-homosteroids) by a hydroxy group and by an aliphatic hydrocarbon group having in the omega-position an amino substituent and being optionally unsaturated in the position adjacent to the steroid nucleus.

The fundamental structure of the compounds of the invention is represented by the following formulas:

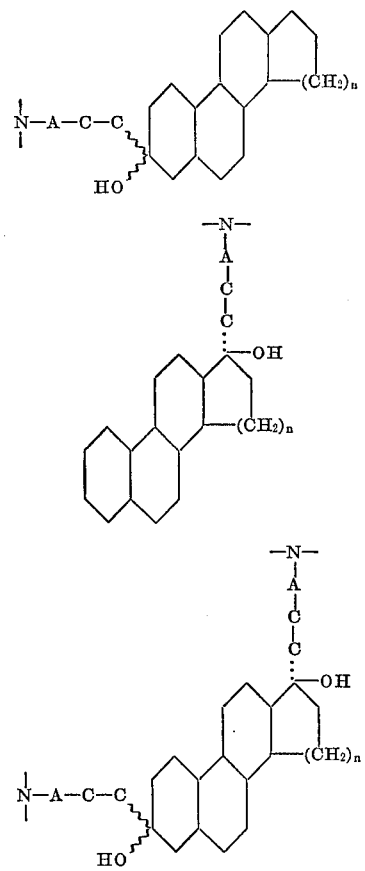

wherein $n$ is 1 or 2, A is lower-alkylene, and the bond between the two depicted carbon atoms of the side-chain can be either saturated or unsaturated.

The inventive concept lies in the nature of the groups in the 3- and/or 17- or 17a-position of the steroid moiety and the exact nature of the steroid moiety itself is not critical to the invention. Preferred types of steroid moieties are those having from eighteen to about twenty-three carbon atoms not counting carbon content which may be provided by esterified hydroxy groups and by the omega-amino-aliphatic hydrocarbon side-chain, and having the estrane (I), androstane (II), D-homoestrane (III) or D-homoandrostane (IV) carbon skeleton.

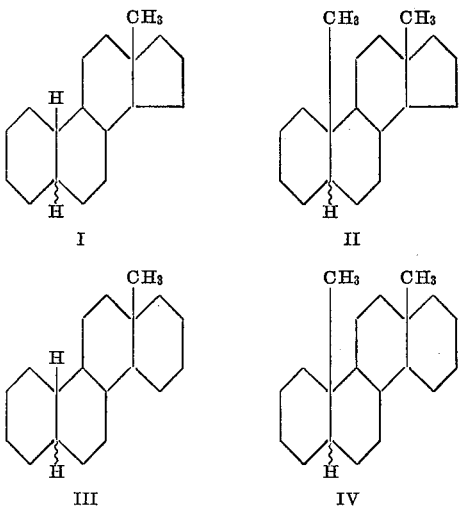

The use of a wavy line connecting the hydrogen atom to the 5-position indicates that both stereochemical configurations ($\alpha$ and $\beta$) are intended.

The steroid moiety can contain varying degrees of unsaturation and a variety of substituents in the form of hydrocarbon radicals or functional groups conventionally employed in the steroid art, well known to impart hormonal or other endocrinological or pharmacological properties, as set forth in standard textbooks such as Steroids by Fieser and Fieser (Reinhold, 1959). The steroid moiety thus can have one or more substituents at various positions of the nucleus, taking into account the positions already occupied by the amino-aliphatic side-chain, for example, hydroxy, mercapto or acyloxy at positions 1, 2, 3, 4, 5, 6, 7, 9, 11, 12, 14, 15, 16 or 17; oxo at positions 1, 2, 3, 4, 6, 7, 11, 12, 15, 16 or 17; acetyl, hydroxyacetyl, or 1-hydroxyethyl at position 17; lower-alkyl at positions 1, 2, 4, 6, 7, 11, 12, 16 or 17; or pyrazole or isoxazole rings fused to the 2- and 3-positions, or to the 16- and 17-positions. The steroid moiety can also have one or more double bonds, especially at the 1,2-, 4,5-, 5,6-, 6,7- or 9,11-positions, and compounds where ring A or both rings A and B are aromatic are also contemplated, in which event the amino-aliphatic side-chain can be present only at the 17(or 17a)-position.

Esterified hydroxy steroids are included within the scope of thein vention although the carbon content contributed by the acid moiety of the esters is not considered part of the essential carbon content of the steroid. When acyloxy radicals are present in the steroid moiety, the acyl radicals are preferably derived from carboxylic acids having from one to ten carbon atoms and molecular weights less than 200. Representative of the acyl radicals which can be present are lower-alkanoyl, e.g., formyl, acetyl, propionyl, butyryl, isobutyryl, caproyl, heptanoyl, octanoyl, trimethylacetyl, and the like; carboxy-lower-alkanoyl, e.g., succinyl ($\beta$-carboxypropionyl); cyclolakyl-lower-alkanoyl wherein cycloalkyl has 5–6 ring members, e.g., $\beta$-cyclopentylpropionyl, $\beta$-cyclohexylpropionyl, and the like; benzoyl; phenyl-lower-alkanoyl or -alkenoyl, e.g., phenylacetayl, $\beta$-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the latter can be unsubstituted or substituted by from one to three substitutents inert under the reaction conditions used, including lower-alkyl, lower-alkoxy, halogen (including fluorine, chlorine, bromine and iodine) and nitro.

The invention thus is concerned with steriods having in the 3- and/or 17-position (3- and/or 17a-position in the case of D-homosteroids) a hydroxy group and an omega-amino-lower-aliphatic hydrocarbon group, wherein the steroid moiety has from eighteen to twenty-three carbon atoms exclusive of ester radicals and of the omega-amino-lower-aliphatic hydrocarbon group, and has the estrane, androstane, D-homoestrane or D-homoandrostane carbon skeleton, and wherein the omega-amino-lower-aliphatic hydrocarbon group is a member of the group consisting of omega-amino-1-lower-alkynyl, omega-amino - 1 - lower-alkenyl and omega-amino-lower-alkyl, wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino.

In the above definitions of Z and Z' the term "lower-alkyl" refers to alkyl groups having from one to four carbon atoms, thus including methyl, ethyl, propyl, isopropyl, butyl and the like. The term "cycloalkyl of 5–6 ring members" includes cyclopentyl and cyclohexyl and lower-alkylated derivatives thereof such as 3-methylcyclopentyl, 4-ethylcyclohexyl and the like. When Z' stands for lower-alkanoyl, it includes such groups having from one to about six carbon atoms, such as formyl, acetyl, propionyl, butyryl, isobutyryl, caproyl and the like.

When NZZ' together represents lower-alkylated piperidino, pyrrolidino, hexamethylenimino, morpholino or piperazino, there can be from one to three lower-alkyl groups containing from one to four carbon atoms. The lower-alkyl groups are attached to carbon except in the case of piperazino where the 4-nitrogen atom can be alkylated.

The complete side-chain at the 3- and/or 17 (or 17a)-position can be depicted as —C—C—A—NZZ' where —NZZ' has the meaning given hereinabove, A is a lower-alkylene bridge having from one to four carbon atoms and the bond between the two depicted carbon atoms is a single, double or triple bond.

The compounds of the invention bearing an omega-amino-1-alkynyl substituent are prepared by causing a 3-oxo-steroid, a 17-oxo-steroid, a 3-oxo-D-homosteroid, a 17a-oxo-D-homosteroid, a 3,17-dioxo-steriod or a 3,17a-dioxo-D-homosteroid having from eighteen to twenty-three carbon atoms exclusive of ester radicals and a carbon skeleton selected from estrane, androstane, D-homoestrane and D-homoandrostane to react with an alkali metal or alkaline earth metal derivative of an omega-amino-1-alkyne, HC≡C—A—NZZ'. The metal derivative can be prepared in situ from the omega-amino-1-alkyne and, for example, a Grignard reagent (alkylmagnesium halide), alkali metal amide, e.g., lithium amide, or an alkali metal alkoxide, e.g., potassium tertiary-butoxide under anhydrous conditions. In the event that only one side-chain is to be introduced, at least one molar equivalent of said metal derivative relative to the oxo-steroid is employed. In the event that two side-chains are to be introduced, at least two molar equivalents of said metal derivative relative to the oxo-steroid are employed.

The omega-amino-1-alkynes are in turn prepared by reacting the corresponding omega-halo-1-alkynes, HC≡C—A—Hal with the appropriate amines, HNZZ'.

Oxo groups in positions of the steroid nucleus other than $C_3$ or $C_{17}$ can be protected against reaction with the metal derivative of the omega-amino-1-alkyne by prior formation of a ketal or thioketal derivative. The oxo group thus protected can be regenerated by acid cleavage after the introduction of the side-chain. An oxo group at $C_{11}$ is, however, sufficiently unreactive so that it is not necessary to protect it against the reaction in question. It is also possible to effect transformations of functional groups on the steroid nucleus after the side-chain has been introduced. For example nuclear hydroxy groups can be oxidized to oxo groups by the Oppenauer method, or they can be acylated by conventional esterification procedures. The tertiary hydroxy group at $C_3$ and/or $C_{17}$ can be esterified but only under vigorous conditions, as by extended heating at reflux with an acid anhydride in pyridine.

The compounds of the invention bearing an omega-amino-1-alkenyl or an omega-aminoalkyl substituent can be prepared by catalytically hydrogenating, either partially or completely, the corresponding compounds bearing an omega-amino-1-alkynyl substituent. The types of catalyst which can be employed for reduction of acetylenic to ethylenic linkages or of acetylenic and ethylenic to saturated linkages are well-known to those skilled in the art.

A particularly preferred group of compounds of the invention, because of the ready availability of starting materials, are those having the general formula

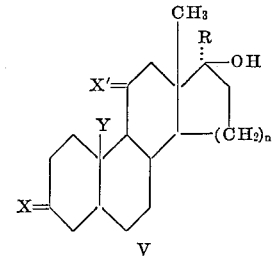

V wherein X is selected from the group consisting of O, ($\alpha$-OH)(H), ($\beta$-OH)(H) and lower-alkylenedioxy; X' is selected from the group consisting of $H_2$, O, ($\alpha$-OH)(H) and ($\beta$-OH)(H); Y is a member of the group consisting of hydrogen and methyl; $n$ is an integer from 1 to 2; and R is a member of the group consisting of omega-amino-1-lower-alkynyl, omega-amino - 1 - lower - alkenyl, and omega-amino-lower-alkyl, wherein the omega-amino group is of the formula NZZ' where NZZ' has the meaning given hereinabove. Also included in said particularly preferred group are compounds of the above formula having a double bond at the 4,5-position, X being O; compounds of the above Formula V having a double bond at the 5,6-position, X being (OH)(H) or lower-alkylenedioxy; and esters of the foregoing compounds, said esters being derived from carboxylic acids having from 1 to 10 carbon atoms and a molecular weight less than 200.

The compounds of Formula V wherein R is omega-amino-1-lower-alkynyl can be prepared by causing a compound of the formula

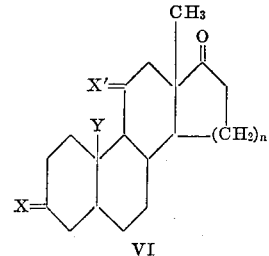

VI wherein X is selected from the group consisting of ($\alpha$-OH)(H), ($\beta$-OH)(H) and lower-alkylenedioxy, and X' is selected from the group consisting of $H_2$, O, ($\alpha$-OH)(H) and ($\beta$-OH)(H), and Y and $n$ have the meanings given hereinabove, to react with an alkali or alkaline earth metal derivative of an omega-amine-1-lower-alkyne. The corresponding compounds of Formula XI where R is omega-amino-1-lower-alkenyl or omega-amino-lower-alkyl are produced by catalytic hydrogenation of the omega-amino-1-lower-alkynyl compounds.

Another particularly preferred group of compounds of the invention, because of ready availability of starting materials, are those having the general formula

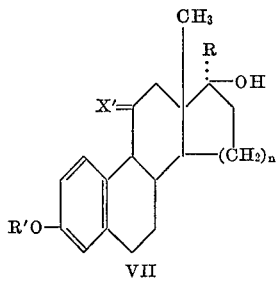

VII wherein X' is selected from the group consisting of $H_2$, O, ($\alpha$-OH)(H) and ($\beta$-OH)(H); $n$ is an integer from 1 to 2; R' is a member of the group consisting of hydrogen and lower-alkyl; and R is a member of the group consisting of omega-amino-1-lower-alkynyl, omega-amino-1-lower-alkenyl, and omega-amino-lower-alkyl, wherein the omega-amino group is of the formula NZZ' where NZZ' has the meaning given hereinabove. Also included in said particularly preferred group are compounds of Formula VII having a double bond at the 6,7-position; compounds of Formula VII having double bonds in the 6,7- and 8,9-positions; and esters of the foregoing compounds, said esters being derived from carboxylic acids having from 1 to 10 carbon atoms and a molecular weight less than 200.

The compounds of Formula VII wherein R is omega-amino-1-lower-alkynyl can be prepared by causnig a compound of the formula

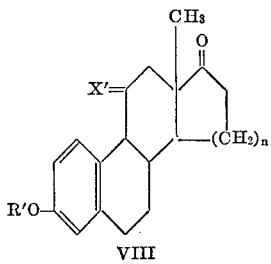

VIII wherein X', R' and $n$ have the meanings given hereinabove to react with an alkali or alkaline earth metal derivative of an omega-amino-1-lower-alkyne. The corresponding compounds of Formula VII where R is omega-amino-1-lower-alkenyl or omega-amino-1-lower-alkyl are produced by catalytic hydrogenation of the omega-amino-1-lower-alkynyl compounds.

Still another particularly preferred group of compounds of the invention, because of ready availability of starting materials, are those having the general formula

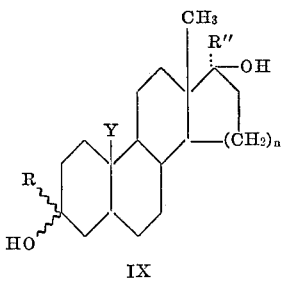

IX wherein $n$ is an integer from 1 to 2; R" is a member of the group consisting of hydrogen and lower-alkyl; Y is a member of the group consisting of hydrogen and methyl; and R is a member of the group consisting of omega-amino-1-lower-alkynyl, omega - amino - 1 - lower-alkenyl, and omega-amino-lower-alkyl, wherein the omega-amino group is of the formula NZZ', where NZZ' has the meaning given hereinabove; including esters of the foregoing compounds, said esters being derived from carboxylic acids having from 1 to 10 carbon atoms and a molecular weight less than 200. Also included in said particularly preferred group are compounds of Formula IX having a double bond at the 4,5-position.

In compounds of Formula IX, the configuration of the groups at the 3-position depends largely on the configuration at the 5-position. It is probable that the large group R will assume the more stable equatorial configuration, and hence will be $3\alpha$ if the compound has the $5\beta$-androstane carbon skeleton, and will be $3\beta$ if the compound has the $5\alpha$-androstane carbon skeleton.

The compounds of Formula IX wherein R is omega-amino-1-lower-alkynyl can be prepared by causing a compound of the formula

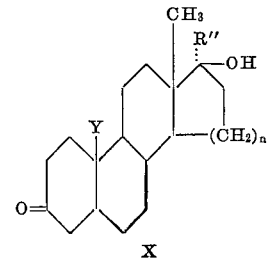

X wherein $n$, R" and Y have the meanings given hereinabove to react with an alkali or alkaline earth metal derivative of an omega-amino-1-lower alkyne.

Steroids of the type

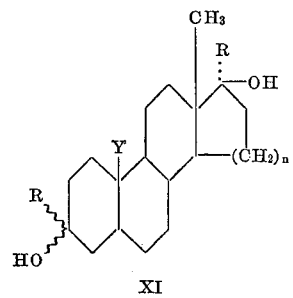

XI wherein $n$ is an integer from 1 to 2; Y is a member of the group consisting of hydrogen and methyl; and R is omega-amino-1-loweralkynyl, including the corresponding 4,5-unsaturated compounds, can be prepared by causing a compound of the formula

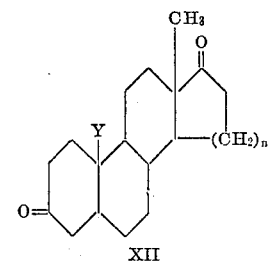

XII or a corresponding 4,5-unsaturated compound to react with an alkali or alkaline earth metal derivative of an omega-amino-1-lower-alkyne. The corresponding compounds of Formula XI where R is omega-amino-1-lower-alkenyl or omega-amino-lower-alkyl are produced by catalytic hydrogenation of the omega-amino-1-lower-alkynyl compounds.

The compounds of the invention are basic in character and will form acid-addition salts upon addition of strong acids. Those compounds which are tertiary-amines will also form quarternary ammonium salts upon addition of esters of strong acids. These salts are the full equivalent of the corresponding free bases insofar as their physiological properties are concerned. Both the free base and salt forms are considered to be one and the same invention.

The acid-addition salts are prepared by causing the amino-substituted steroid to react with a strong inorganic or organic acid, usually in an inert solvent or reaction medium. Examples of appropriate acids include hydrochloric, hydrobromic, sulfuric, phosphoric, citric, tartaric, quinic, benzenesulfonic acid, and the like.

The quaternary ammonium salts of the compounds of the invention are prepared by causing an amino-substituted steroid to react with an ester of a strong inorganic or organic sulfonic acid, said ester preferably having a molecular weight less than about 200. A particularly preferred class of esters, because of their ready availability, are lower-alkyl, lower-alkenyl, and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the amino-substituted steroid and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the amino-substituted steroid, and serve as intermediates for non-toxic quaternary salts by conventional ion exchange reactions. All acid-addition salts, regardless of the nature of the anions, are useful as intermediates in the purification of the free bases.

Endocrinological evaluation of the compounds of the invention has shown that they possess useful metabolic, hormonal and anti-hormonal properties. In particular they have useful pituitary inhibiting activities. Those compounds having an aromatic ring A have useful estrogenic and hypocholesteremic properties.

Pharmacological evaluation of the compounds of the invention has demonstrated that they possess useful cardiovascular properties. In particular they are active as coronary dilators and as cardiac antiaccelerators.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

17α-(3-diethylamino-1-propynyl)-5-androstene-3β,17β-diol [V; X is (β—OH)(H), X' is $H_2$, Y is $CH_3$, $n$ is 1, R is C≡$CCH_2N(C_2H_5)_2$; $\Delta^5$].

3-diethylamino-1-propyne (11.2 g.) was added to a solution of ethylmagnesium bromide prepared from 2.43 g. of magnesium and 12.0 g. of ethyl bromide in 60 ml. of ether. 5-androsten-3b-ol-17-one 3-(2'-tetrahydropyranyl) ether (7.44 g.) in 100 ml. of tetrahydrofuran was then added, and the reaction mixture was heated at reflux for about sixteen hours. Then 200 ml. of 20% aqueous ammonium chloride was added, and the mixture was extracted with ether and the ether extracts were washed with dilute hydrochloric acid. The hydrochloric acid solution was heated for two hours on a steam bath, cooled and made basic with dilute sodium hydroxide solution. The alkaline mixture was extracted with ether, and the ether extracts were washed with water, dried over anhydrous sodium sulfate and treated with an excess of ethereal hydrogen chloride. The precipitate which formed was collected to give 3.6 g. of 17α-(3-diethylamino-1-propynyl)-5-androstene-3β,17β-diol in the form of its hydrochloride salt, M.P. 255–260° C. (dec.) (uncorr.), which was recrystallized from ethanol and converted to the free base with dilute sodium hydroxide. The product was extracted with ether, isolated by evaporation and recrystallized from ethyl acetate to give 17α-(3-diethylamino-1-propynyl)-5-androstene-3β,17β-diol, M.P. 118.6–120.6° C. (corr.), $[\alpha]_D^{25}=-108.0°$ (1% in chloroform).

The material from the ethyl acetate mother liquors was dissolved in a mixture of equal volumes of ether and pentane and chromatographed on 400 g. of silica gel. The column was eluted with ether-pentane 1:1 and 3:1 and then with pure ether. The ether eluant brought out a new product which was recrystallized first from ethyl acetate and then repeatedly from hexane to give 17α-(3-diethylamino-1-propynyl)-5-androstene-3β,17β-diol 3-(2'-tetrahydropyranyl) ether in the form of colorless needles, M.P. 107.8–114.4° C. (corr.), $[\alpha]_D^{25}=-227.1°$ (1% in chloroform). Further elution of the column with ether-acetone brought out some additional 17α-(3-diethylamino-1-propynyl)-5-androstene-3β,17β-diol.

EXAMPLE 2

17α-(3-diethylamino-1-propynyl)-5α-androstane-3β,17β-diol [V; X is (β—OH)(H), X' is $H_2$, Y is $CH_3$, $n$ is 1, R is C≡$CCH_2N(C_2H_5)_2$] was prepared from 44.45 g. of 5α-androstan-3β-ol-17-one 3-(2'-tetrahydropyranyl) ether, 44.4 g. of 3-diethylamino-1-propyne and 100 ml. of 3 M methylmagnesium bromide in ether according to the procedure described above in Example 1. The product was purified by chromatography on silica gel and recrystallized from ethyl acetate to give 17α-(3-diethylamino-1-propynyl)-5α-androstane-3β,17β-diol in the form of colorless needles, M.P. 151.8–153.2° C. (corr.), $[\alpha]_D^{25}=-37.4°$ (1% in chloroform), infrared absorption at 3.00–3.13, 3.44 and 6.88μ; hydrochloride salt, M.P. 280–281° C. (uncorr.).

17α-(3-diethylamino-1-propynyl)-5α-androstane-3β,17β-diol was found to have a coronary dilator activity 130% that of papaverine when tested on the isolated rabbit heart.

17α-(3-diethylamino-1-propynyl)-5α-androstane-3β,17β-diol can be caused to react with acetic anhydride, caproyl chloride, succinic anhydride, β-cyclopentylpropionic anhydride, benzoyl chloride, p-toluyl chloride, p-methoxybenzoyl chloride, p-nitrophenylacetyl chloride, cinnamoyl chloride, p-chlorophenoxyacetyl chloride, or nicotinoyl chloride, by gentle heating in the presence of pyridine, to give, respectively 3β-acetoxy-17α-(3-diethylamino-1-propynyl)-5α-androstan-17β-ol,3β-caproyloxy-17α-(3-diethylamino-1-propynyl)-5α-androstan-17β-ol, 3β-(β-carboxypropionoxy)-17α-(3-diethylamino-1-propynyl)-5α-androstan-17β-ol, 3β-(β-cyclopentylpropionoxy)-17α-(3-diethylamino-1-propynyl)-5α-androstan-17β-ol, 3β-benzoyloxy-17α-(3-diethylamino-1-propynyl)-5α-androstan-17β-ol, 3β-(p-toluyloxy)-17α-(3-diethylamino-1-propynyl)-5α-androstan-17β-ol, 3β-(p-methoxybenzoyloxy)-17α-(3-diethylamino-1-propynyl)-5α-androstan-17β-ol, 3β-(p-nitrophenylacetoxy)-17α-(3-diethylamino-1-propynyl)-5α-androstan-17β-ol, 3β-cinnamolyloxy-17α-(3-diethylamino-1-propynyl)-5α-androstan-17β-ol, 3β-(p-chlorophenoxyacetoxy)-17α-(3-diethylamino-1-propynyl)-5α-androstan-17β-ol, or 3β-nicotinoyloxy-17α-(3-diethylamino-1-propynyl)-5α-androstan-17β-ol.

EXAMPLE 3

17α-(3-diethylaminopropyl)-5α-androstane-3β,17β-diol [V; X is (β—OH)(H), X' is $H_2$, Y is $CH_3$, $n$ is 1, R is $CH_2CH_2CH_2N(C_2H_5)_2$].

A solution of 7.83 g. of 17α-(3-diethylamino-1-propynyl)-5α-androstane-3β,17β-diol (Example 2) in 300 ml. of ethanol was hydrogenated in the presence of 0.5 g. of 30% palladium hydroxide on strontium carbonate catalyst. After two moles of hydrogen had been absorbed the catalyst was removed by filtration and the product was isolated by concentrating the solution. The product was recrystallized from ethyl acetate to give 17α-(3-diethylaminopropyl)-5α-androstane-3β,17β-diol in the form of colorless needles, M.P. 141–142.5° C. and 153–155° C. (corr.), $[\alpha]_D^{25} = +2.20$ (1% in chloroform).

17α - (3-diethylaminopropyl) - 5α-androstane-3β,17β-diol was found to have a coronary dilator activity 57% that of papaverine when tested on the isolated rabbit heart.

EXAMPLE 4

17α - (3-diethylamino-1-propynyl) - 4-androsten-17β-ol-3-one [V; X is O, X' is $H_2$, Y is $CH_3$, $n$ is 1, R is $C \equiv CCH_2N(C_2H_5)_2$; $\Delta^4$].

A solution of 4.56 g. of 17α-(3-diethylamino-1-propynyl)-5-androstene-3β,17β-diol (Example 1) in 200 ml. of toluene was distilled briefly to remove traces of water. The solution was cooled and 30 ml. of cyclohexanone and 4.08 g. of aluminum isopropoxide were added. The reaction mixture was stirred with slow distillation for one hour, and then 100 ml. of a solution of 20 g. of potassium sodium tartrate was added. The aqueous layer was separated and extracted with 200 ml. of benzene. The benzene and toluene solutions were combined, washed with 200 ml. of water and extracted with two 100 ml. portions of 1 N hydrochloric acid. The hydrochloric acid extracts were made basic with sodium hydroxide solution, and the product was extracted with ether. The ether extracts were washed with water and saturated sodium chloride solution, dried over anhydrous magnesium sulfate and concentrated to dryness. The residue was recrystallized from ethyl acetate to give 17α-(3-diethylamino-1-propynyl)-4-androsten-17β-ol-3-one in the form of colorless prisms, M.P. 119.2–120.6° C. (corr.), $$[\alpha]_D^{25} = +10.1°$$

(1% in chloroform), ultraviolet maximum at 241 mμ ($\epsilon=16,150$), infrared absorption at 2.91, 3.46, 6.04, 6.21, 6.89 and 6.97μ.

EXAMPLE 5

17α - (3-diethylamino-1-propynyl) - 5α-androstan-17β-ol-(3-one [V; X is O, X' is $H_2$, Y is $CH_3$, $n$ is 1, R is $C \equiv CCH_2N(C_2H_5)_2$] was prepared from 17.04 g. of 17α - (3-diethylamino-1-propynyl)-5α-androstane-3β,17β-diol (Example 2), 120 ml. of cyclohexanone and 16.3 g. of aluminum isopropoxide in 1000 ml. of toluene according to the procedure described above in Example 4. The product was purified by dissolving it in methylene dichloride and chromatographing it on 500 g. of silica gel. The column was eluted with ether-methylene dichloride-pentane mixtures, then with ether-methylene dichloride 9:1 and with ether alone. The latter two eluants brought out the desired product which was recrystallized from ethyl acetate to give 17α-(3-diethylamino-1-propynyl)-5α-androstan-17β-ol-3-one, M.P. 120.0–121.2° C. (corr.), $[\alpha]_D^{25} = -21.2°$ (1% in chloroform), infrared absorption at 2.96, 3.42, 5.83 and 6.86μ.

17α - (3-diethylamino-1-propynyl)-5α-androstan-17β-ol-3-one was found to have coronary dilator activity 50–95% that of papaverine when tested on the isolated rabbit heart.

EXAMPLE 6

3 - methoxy - 17α - (3 - dimethylamino - 1 - propynyl)-1,3,5(10)-estratrien-17β-ol [VII; X' is $H_2$, $n$ is 1, R is $C \equiv CCH_2N(CH_3)_2$, R' is $CH_3$] was prepared from 28.4 g. of estrone methyl ether, 24.9 g. of 3-dimethylamino-1-propyne and 90 ml. of 3 M methylmagnesium bromide according to the procedure described above in Example 1. The product was purified by dissolving it in methylene dichloride and chromatographing it on 400 g. of silica gel. The column was eluted with ether-pentane 1:1, ether, and finally with ether-methanol 20:1. The latter eluant brought out the desired product which was recrystallized from acetonitrile to give 3-methoxy-17α-(3-dimethylamino - 1 - propynyl) - 1,3,5(10)-estratrien-17β-ol in the form of colorless prisms, M.P. 117.0–119.2° C. (corr.), $[\alpha]_D^{25} = -8.4°$ (1% in chloroform).

The methiodide salt of 3-methoxy-17α-(3-dimethylamino - 1-propynyl)-1,3,5(10)-estratrien-17β-ol, colorless plates, M.P. 227.0–229.0° C. (dec.) (corr.), $$[\alpha]_D^{25} = -4.4°$$

(1% in chloroform), was prepared by heating the tertiary base with an excess of methyl iodide in acetonitrile solution and recrystallizing the resulting product from methanol.

3 - methoxy - 17α - (3 - dimethylamino - 1 - propynyl)-1,3,5(10)-estratrien-17β-ol was found to exhibit pituitary inhibiting activity in rats at a dose level of 5.0 mg./kg., was stimulatory as an estrogen ($ED_{50}=4.75$ mg./kg.), and was active as a hypochloesteremic agent (five times triparanol).

By replacing the 3-dimethylamino-1-propyne in the foregoing preparation by a molar equivalent amount of 3-cyclohexylamino-1-propyne,
3-dicyclopentylamino-1-propyne,
3-(4-ethylcyclohexylamino)-1-propyne,
3-benzylamino-1-propyne,
3-phenethylamino-1-propyne,
3-dibenzylamino-1-propyne,
3-(N-benzyl-N-methylamino)-1-propyne,
3-(1-piperidyl)-1-propyne,
3-(1-pyrrolidyl)-1-propyne,
3-(1-hexamethyleniminyl)-1-propyne,
3-(4-morpholinyl)-1-propyne,
3-(1-piperazinyl)-1-propyne,
3-(3,4,5-trimethyl-1-piperidyl)-1-propyne,
3-(3-ethyl-1-pyrrolidyl)-1-propyne,
3-(4-methyl-1-hexamethyleniminyl)-1-propyne,
3-(2-methyl-4-morpholinyl)-1-propyne,
5-dimethylamino-1-pentyne,
6-dimethylamino-1-hexyne, or 5-dimethylamino-4-methyl-1-pentyne there can be obtained, respectively 3-methoxy-17α-(3-cyclohexylamino-1-propynyl)-
  1,3,5(10)-estra-trien-17β-ol,
3-methoxy-17α-(3-dicyclopentylamino-1-propynyl)-
  1,3,5(10)-estratrien-17β-ol,
3-methoxy-17α-[3-(4-ethylcyclohexylamino)-1-
  propynyl]-1,3,5(10)-estratrien-17β-ol,
3-methoxy-17α-(3-benzylamino-1-propynyl)-
  1,3,5(10)-estratrien-17β-ol,
3-methoxy-17α-(3-phenethylamino-1-propynyl)-
  1,3,5(10)-estratrien-17β-ol,
3-methoxy-17α-(3-dibenzylamino-1-propynyl)-
  1,3,5(10)-estratrien-17β-ol,
3-methoxy-17α-[3-(N-benzyl-N-methylamino)-1-
  propynyl]-1,3,5(10)-estratrien-17β-ol,
3-methoxy-17α-[3-(1-piperidyl)-1-propynyl]-1,3,5(10)-
  estratrien-17β-ol,
3-methoxy-17α-[3-(1-pyrrolidyl)-1-propynyl]-1,3,5(10)-
  estratrien-17β-ol,
3-methoxy-17α-[3-(1-hexamethyleniminyl)-1-propynyl]-
  1,3,5(10)-estratrien-17β-ol,
3-methoxy-17α-[3-(4-morpholinyl)-1-propynyl]-
  1,3,5(10)-estratrien-17β-ol,
3-methoxy-17α-[3-(1-piperazinyl)-1-propynyl]-
  1,3,5(10)-estratrien-17β-ol,
3-methoxy-17α-[3-(3,4,5-trimethyl-1-piperidyl)-1-
  propynyl]-1,3,5(10)-estratrien-17α-ol,
3-methoxy-17α-[3-(3-ethyl-1-pyrrolidyl)-1-propynyl]-
  1,3,5(10)-estratien-17β-ol,
3-methoxy-17α-[3-(4-methyl-1-hexameleniminyl)-1-
  propynyl]-1,3,5(10-)estratrien-17β-ol, 3-methoxy-17α-[3-(2-methyl-4-morpholinyl)-1-propynyl]-1,3,5(10)-estratrien-17β-ol, 3-methoxy-17α(5-dimethylamino-1-pentynyl)-1,3,5(10)-estratien-17β-ol, 3-methoxy-17α-(6-dimethylamino-1-hexynyl)-1,3,5(10)-estratrien-17β-ol, or 3-methoxy-17α-(5-dimethylamino-4-methyl-1-pentynyl)-1,3,5(10)-estratrien-17β-ol.

The foregoing compounds can be subjected to catalytic hydrogenation to produce the corresponding omega-amino-1-alkenyl and omega-aminoalkyl compounds.

3 - methoxy - 17α - (3 - dimethylamino - 1 - propynyl)-1,3,5(10)-estratrien-17β-ol when heated at reflux with an excess of acetic anhydride in pyridine solution for about eighteen hours is converted to 17β-acetoxy-3-methoxy-17α-(3-dimethylamino-1 - propynyl) - 1,3,5(10)-estratriene.

EXAMPLE 7

3 - methoxy - 17α - (3 - diethylamino - 1 - propynyl)-1,3,5(10)-estratrien-17β-ol [VII; X' is $H_2$, $n$ is 1, R is C≡$CCH_2N(C_2H_5)_2$, R' is $CH_3$] was prepared from 28.4 g. of estrone methyl ether, (55.6 g. of 3-diethylamino-1-propyne and 150 ml. of 3 M methylmagnesium bromide according to the procedure described above in Example 1. The product was recrystallized from acetonitrile to give 3-methoxy-17α-(3-diethylamino-1-propynyl) - 1,3,5(10)-estratrien-17β-ol in the form of colorless needles, M.P. 98.6–100.0° C. (corr.), $[α]_D^{25}$ = −9.4° (1% in chloroform).

EXAMPLE 8

3 - methoxy - 17α - (3 - dimethylamino - 1 - propynyl)-1,3,5(10)-estratrien-17β-ol [VII; X' is $H_2$, $n$ is 1, R is $CH_2CH_2CH_2N(CH_3)_2$, R' is $CH_3$].

A solution of 11.03 g. of 3-methoxy-17α-(3-dimethylamino-1-propynyl)-1,3,5(10)-estratrien-17β-ol (Example 6) in 300 ml. of ethanol was hydrogenated in the presence of 1.00 g. of 10% palladium-on-carbon catalyst. After two moles of hydrogen had been absorbed, the product was isolated and recrystallized from acetonitrile to give 3-methoxy-17α-(3-dimethylamino - 1 - propyl) - 1,3,5(10)-estratrien-17β-ol in the form of colorless needles, M.P. 113.0–114.2 C. (corr.), $[α]_D^{25}$ = +49.6° (1% in chloroform).

3-methoxy-17α-(3-dimethylamino - 1 - propyl)-1,3,5(10)-estratrien-17β-ol was found to be active as estrogen and caused decrease in serum β-lipoproteins, lipids and cholesterol in cockerels.

EXAMPLE 9

3-methoxy-17α-(3-dimethylamino - 1 - propenyl)-1,3,5(10)-estratrien-17β-ol [VII; X' is $H_2$, $n$ is 1, R is

CH=$CHCH_2N(CH_3)_2$

R' is $CH_3$].

A solution of 7.35 g. of 3-methoxy-17α-(3-dimethylamino-1-propynyl)-1,3,5(10)-estratrien-17β-ol in 300 ml. of pyridine was hydrogenated in the presence of 0.5 g. of 30% palladium hydroxide on strontium carbonate catalyst. The reduction was stopped after one mole of hydrogen had been absorbed, and the product was isolated and recrystallized from ethyl acetate and from acetonitrile to give 3-methoxy-17α-(3-dimethylamino-1-propenyl)-1,3,5(10)-estratrien-17β-ol in the form of colorless plates, M.P. 93.8–95.2° C. (corr.), $[α]_D^{25}$=+45.9° (1% in chloroform).

3-methoxy-17α-(3-dimethylamino - 1 - propenyl)-1,3-5(10)-estratrien-17β-ol was found to be active as an estrogen at 2.5–10.0 mg./kg., and was active as a hypocholesteremic agent.

EXAMPLE 10

3α-acetoxy-17aα-(3-diethylamino - 1 - propynyl)-D-homo-5β-androstan-17aβ-ol-11-one [V; X is (α-$CH_3$COO) (H), X' is 0, Y is $CH_3$, $n$ is 2, R is C≡$CCH_2N(C_2H_5)_2$].

3-diethylamino-1-propyne (10.9 g.) in 40 ml. of tertiary-butyl alcohol was added over a period of fifteen minutes to a solution of potassium tertiary-butoxide prepared from 12.8 g. of potassium and 360 ml. of tertiary-butyl alcohol. The mixture was stirred for forty minutes and then 16.0 g. of D-homo-5β-androstan-3α-ol-11,17a-dione was added. After twenty hours at room temperature three liters of water was added and the solid product was collected by filtration and washed with water. The product was treated with an excess of acetic anhydride in pyridine solution for one hour on a steam bath, and the acetylated product was isolated, dissolved in 100 ml. of ether and 900 ml. of pentane and chromatographed on 900 g. of silica gel. The column was eluted with pentane-ether mixtures containing gradually increasing proportions of ether, and then with ether alone which brought out the desired product (14.6 g.). The latter was recrystallized repeatedly from petroleum ether to give 3α-acetoxy-17aα-(3-diethylamino - 1-propynyl)-D-homo-5β-androstan-17aβ-ol-11-one, M.P. 116.7–118.3° C. (corr.), $[α]_D^{24}$=+13.0° (1% in chloroform).

3α-acetoxy-17aα-(3-diethylamino - 1 - propynyl)-D-homo-5β-androstan-17aβ-ol-11-one was found to have a coronary dilator activity equal to that of papaverine when tested on the isolated rabbit heart.

A sample of 3α-acetoxy-17aα-(3-diethylamino-1-propynyl)-D-homo-5β-androstan - 17aβ-ol-11-one was hydrolyzed by heating two hours at reflux in a solution of potassium hydroxide in methanol to give 17aα-(3-diethylamino-1-propynyl)-D-homo - 5β - androstane-3α, 17aβ-diol-11-one, M.P. 181–184.5° C. (uncorr.) when recrystallized from ethyl acetate.

EXAMPLE 11

3ξ-(3-diethylamino-1-propynyl) - 5β - androstane-3ξ, 17β-diol [IX; Y is $CH_3$, $n$ is 1, R is $(C_2H_5)_2NCH_2C≡C$, R" is H] was prepared from 29.0 g. of 5β-androstan-17β-ol-3-one, 21.8 g. of 3-diethylamino-1-propyne and 22.4 g. of potassium tertiary-butoxide according to the procedure described above in Example 10. The product was recrystallized first from acetonitrile and then from methanol and was obtained in the form of colorless needles, M.P. 213.2–214.8° C. (corr.); $[α]_D^{25}$=+20.6° (1% in chloroform).

EXAMPLE 12

3ξ-(3-diethylaminopropyl) - 5β - androstane-3ξ,17β-diol [IX; Y is $CH_3$, $n$ is 1, R is $(C_2H_5)_2NCH_2CH_2CH_2$, R" is H] was prepared by hydrogenation of 10.14 g. of 3ξ-(3-diethylamino-1-propynyl) - 5β - androstane-3ξ,17β-diol (Example 11) in the presence of 1.0 g. of 10% palladium-on-carbon catalyst according to the procedure described above in Example 8. The product was recrystalized from ethyl acetate and had the M.P. 118.6–119.4° C. (corr.); $[α]_D^{25}$=+8.7° (1% in chloroform).

3ξ-(3-diethylaminopropyl) - 5β - androstane-3ξ,17β-diol was found to lower blood cholesterol levels when administered to cockerels at a dose level of 100 mg./kg.

EXAMPLE 13

17α-methyl-3ξ-(3 - dimethylamino - 1-propynyl)-5β-androstane-3ξ,17β-diol [IX; Y is $CH_3$ $n$ is 1, R is

R" is $CH_3$] was prepared from 30.4 g. of 17α-methyl-5β-androstan-17β-ol-3-one, 16.6 g. of 3-dimethylamino-1-propyne and 22.4 g. of potassium tertiary-butoxide according to the procedure described above in Example 10. The product was recrystallized from ethyl acetate and was obtained in the form of colorless prisms, M.P. 194.4–195.2° C. (corr.); $[α]_D^{25}$=+3.2° (1% in chloroform).

EXAMPLE 14

17α-methyl-3ξ-(3-dimethylamino - 1 - propenyl)-5β-androstane-3ξ,17β-diol [IX; Y is $CH_3$, $n$ is 1, R is (CH₃)₂NCH₂CH=CH, R″ is CH₃] was prepared by hydrogenation of 15.25 g. of 17α-methyl-3ξ-(3-dimethylamino-1-propynyl)-5β-androstane-3ξ,17β-diol (Example 13) in the presence of 0.5 g. of 30% palladium hydroxide on strontium carbonate catalyst in pyridine solution according to the procedure described above in Example 9. The product was recrystallized first from methanol-ethyl acetate and then from methanol and was obtained in the form of colorless prisms, M.P. 198.0–199.0° C. (corr.); [α]$_D^{25}$=−6.0° (1% in chloroform).

17α-methyl-3ξ-(3-dimethylamino - 1 - propenyl)-5β-androstane-3ξ,17β-diol brought about a 23% decrease in blood cholesterol when administered to cockerels at a dose level of 30 mg./kg.

EXAMPLE 15

17α-methyl-3ξ-(3-dimethylaminopropyl) - 5β - androstane-3ξ,17β-diol [IX; Y is CH₃, n is 1, R is

(CH₃)₂NCH₂CH₂CH₂

R″ is CH₃] was prepared by hydrogenation of 10.2 g. of 17α-methyl-3ξ-(3-dimethylamino - 1 - propenyl)-5β-androstane-3ξ,17β-diol (Example 14) in the presence of 1.0 g. of 10% palladium-on-carbon catalyst according to the procedure described above in Example 8. The product was recrystallized from ethyl acetate and was obtained in the form of colorless prisms, M.P. 163.0–165.4° C. (corr.); [α]$_D^{25}$=−2.3° (1% in chloroform).

17α-methyl-3ξ - (3-dimethylaminopropyl) - 5β-androstane-3ξ,17β-diol brought about a 22% decrease in blood cholesterol when administered to cockerels at a dose level of 30 mg./kg. It also was found to have coronary dilator activity when tested on the isolated rabbit heart.

3ξ - (3 - dimethylamino - 1 - propynyl)-5β-androstane-3ξ,17β-diol (Example 11) can be caused to react with acetic anhydride, caproyl chloride, succinic anhydride, β-cyclopentylpropionic anhydride, benzoyl chloride, p-toluyl chloride, p-methoxybenzoyl chloride, p-nitrophenylacetyl chloride, cinnamoyl chloride, p-chlorophenoxyacetyl chloride, or nicotinoyl chloride, by gentle heating in the presence of pyridine, to give, respectively, 17β-acetoxy-3ξ-(3-diethylamino-1-propynyl)-5β-androstan-3ξ-ol,
17β-caproyloxy-3ξ-(3-diethylamino-1-propynyl)-5β-androstan-3ξ-ol,
17β-(β-carboxypropionoxy)-3ξ-(3-diethylamino-1-propynyl)-5β-androstan-3ξ-ol,
17β-(β-cyclopentylpropionoxy)-3ξ-(3-diethylamino-1-propynyl)-5β-androstan-3ξ-ol,
17β-benzoyloxy-3ξ-(3-diethylamino-1-propynyl)-5β-androstan-3ξ-ol,
17β-(p-toluyloxy)-3ξ-(3-diethylamino-1-propynyl)-5β-androstan-3ξ-ol,
17β-(p-methoxybenzoyloxy)-3ξ-(3-diethylamino-1-propynyl)-5β-androstan-ξ-ol,
17β-(p-nitrophenylacetoxy)-3ξ-(3-diethylamino-1-propynyl)-5β-androstan-3ξ-ol,
17β-cinnamoyloxy-3ξ-(3-diethylamino-1-propynyl)-5β-androstan-3ξ-ol,
17β-(p-chlorophenoxyacetoxy)-3ξ-(3-diethylamino-1-propynyl)-5β-androstan-3ξ-ol, or
17β-nicotinoyloxy-3ξ-(3-diethylamino-1-propynyl)-5β-androstan-3ξ-ol.

By replacing the 3-diethylamino-1-propyne in Example 11 by a molar equivalent amount of 3-cyclohexylamino-1-propyne,
3-dicyclopentylamino-1-propyne,
3-(4-ethylcyclohexylamino)-1-propyne,
3-benzylamino-1-propyne,
3-phenethylamino-1-propyne,
3-dibenzylamino-1-propyne,
3-(N-benzyl-N-methylamino)-1-propyne,
3-(1-piperidyl)-1-propyne,
3-(1-pyrrolidyl)-1-propyne,
3-(1-hexamethyleniminyl)-1-propyne,
3-(4-morpholinyl)-1-propyne,
3-(1-piperazinyl)-1-propyne,
3-(3,4,5-trimethyl-1-piperidyl)-1-propyne,
3-(3-ethyl-1-pyrrolidyl)-1-propyne,
3-(4-methyl-1-hexamethyleniminyl)-1-propyne,
3-(2-methyl-4-morpholinyl)-1-propyne,
5-dimethylamino-1-pentyne,
6-dimethylamino-1-hexyne, or
5-dimethylamino-4-methyl-1-pentyne there can be obtained, respectively, 3ξ-(3-cyclohexylamino-1-propynyl)-5β-androstane-3ξ,17β-diol,
3ξ-(3-dicyclopentylamino-1-propynyl)-5β-androstane-3ξ,17β-diol,
3ξ-[3-(4-ethylcyclohexylamino)-1-propynyl]-5β-androstane-3ξ,17β-diol,
3ξ-(3-benzylamino-1-propynyl)-5β-androstane,3ξ,17β-diol,
3ξ-(3-phenethylamino-1-propynyl)-5β-androstane-3ξ,17β-diol,
3ξ-(3-dibenzylamino-1-propynyl)-5β-androstane-3ξ,17β-diol,
3ξ-[3-(N-benzyl-N-methylamino)-1-propynyl]-5β-androstane-3ξ,-17β-diol,
3ξ-[3-(1-piperidyl)-1-propynyl]-5β-androstane-3ξ,17β-diol,
3ξ-[3-(1-pyrrolidyl)-1-propynyl]-5β-androstane-3ξ,17β-diol,
3ξ-[3-(1-hexamethyleniminyl)-1-propynyl]-5β-androstane-3ξ,17β-diol,
3ξ-[3-(4-morpholinyl)-1-propynyl]-5β-androstane-3ξ,17β-diol,
3ξ-[3-(1-piperazinyl)-1-propynyl]-5β-androstane-3ξ,17β-diol,
3ξ-[3-(3,4,5-trimethyl-1-piperidyl)-1-propynyl]-5β-androstane-3ξ,17β-diol,
3ξ-[3-(3-ethyl-1-pyrrolidyl)-1-propynyl]-5β-androstane-3ξ,17β-diol,
3ξ-[3-(4-methyl-1-hexamethyleniminyl)-1-propynyl]-5β-androstane-3ξ,17β-diol,
3ξ-[3-(2-methyl-4-morpholinyl)-1-propynyl]-5β-androstane-3ξ,17β-diol,
3ξ-(5-dimethylamino-1-pentynyl)-5β-androstane-3ξ,17β-diol,
3ξ-(6-dimethylamino-1-hexynyl)-5β-androstane-3ξ,17β-diol, or
3ξ-(5-dimethylamino-4-methyl-1-pentynyl)-5β-androstane-3ξ,17β-diol.

EXAMPLE 16

17aα - (3 - diethylamino - 1 - propyl) - D - homo - 5β-androstane-3α,17aβ-diol-11-one [V; X is (α-OH)(H), X′ is O, Y is CH₃, n is 2, R is CH₂CH₂CH₂N(C₂H₅)₂].

A solution of 4.36 g. of 17aα-(3-diethylamino-1-propynyl)-D-homo-5β-androstane-3α,17aβ-diol-11-one in 250 ml. of methanol was hydrogenated in the presence of 0.1 g. of platinum oxide catalyst until two moles of hydrogen had been absorbed. The mixture was filtered, the filtrate concentrated in vacuo, and the residue recrystallized three times from acetone to give 17aα - (3 - diethylamino - 1-propyl)-D-homo-5β-androstane-3α,17aβ-diol - 11 - one in the form of colorless needles, M.P. 169.1–170.5° C. (corr.), [α]$_D^{25}$=+33.2° (1% in chloroform).

EXAMPLE 17

3-methoxy - 17α - (4-dimethylamino - 1 - butynyl)-1,3,5(10)-estratrien-17β-ol [VII; X′ is H₂, n is 1, R is

C≡CCH₂CH₂N(CH₃)₂

R′ is CH₃].

A mixture of 4.27 g. of 4-dimethylamino-1-butyne, 1.01 g. of lithium amide and 200 ml. of dioxane was heated at reflux for two hours in a nitrogen atmosphere. Estrone methyl ether (11.38 g.) was then added and the mixture heated at reflux under nitrogen for four hours. The reaction mixture was cooled to room temperature, 6 ml. of acetic acid was added, and after standing overnight the solvents were removed by distillation in vacuo. The residue was partitioned between 150 ml. of methylene dichloride and 150 ml. of 2 N sodium hydroxide solution. The organic layer was washed twice with water, dried over anhydrous sodium sulfate and treated with an excess of ethereal hydrogen chloride. The hydrochloride salt of the product was collected by filtration, dried and stirred with 50 ml. of 2 N sodium hydroxide and 200 ml. of ether for three hours. The ether layer was washed with water, dried over anhydrous sodium sulfate and concentrated to a 50 ml. volume. Acetonitrile was added, the ether boiled off and the solution concentrated to a 30 ml. volume, whereupon the product separated, giving a 3-methoxy - 17α - (4 - dimethylamino - 1 - butynyl)-1,3,5(10)-estratrien-17β-ol in the form of colorless needles, M.P. 133.5–134.5° C. (corr.), $[\alpha]_D^{25} = +2.0°$ (1% in chloroform).

EXAMPLE 18

3-methoxy - 17α - (3 - dimethylamino - 1 - propynyl)-1,3,5(10),6-estratetraen-17β-ol [VII; X' is $H_2$; n is 1, R is $C\equiv CCH_2N(CH_3)_2$, R' is $CH_3$; $\Delta^6$] was prepared from 4.00 g. of 6-dehydrostrone methyl ether, 2.58 g. of 3-dimethylamino-1-propyne and 0.65 g. of lithium amide according to the procedure described above in Example 17. The product was obtained in the form of colorless rods, M.P. 141.0–141.8° C. (corr.) when recrystallized from acetonitrile, $[\alpha]_D^{25} = -292.9°$ (1% in chloroform); ultraviolet maxima at 221, 261, 269, 302 and 310 mμ (ε=29,400, 7,600, 6,100, 2,600 and 2,200); infrared absorption at 3.36, 3.43, 3.50, 3.60, 6.15, 6.24, 6.37, 6.72, 6.80, 6.86 and 6.99μ.

3-methoxy - 17α - (3-dimethylamino - 1 - propynyl)-1,3,5(10) - estratetraen - 17β - ol was found to be active as an estrogen at 2.5 mg./kg. and as a hypocholesteremic agent.

EXAMPLE 19

3 - methoxy - 17α - (3-dimethylamino-1-propynyl)-1,3,5(10),6,8-estrapentaen-17β-ol [VII; X' is $H_2$, n is 1, R is $C\equiv CCH_2N(CH_3)_2$, R' is $CH_3$; $\Delta^6,\Delta^8$] was prepared from 5.00 g. of d-equilenin methyl ether, 3.22 g. of 3-dimethylamino-1-propyne and 0.815 g. of lithium amide according to the procedure described above in Example 17. The product was isolated in the form of its hydrochloride salt, M.P. 263.8–264.6° C. (dec.) (corr.) when recrystallized from a chloroform-methanol mixture, $[\alpha]_D^{25} = -139.2°$ (0.5% in ethanol); ultraviolet maxima at 232, 259, 269, 279, 289, 311, 323, 332 and 337 mμ (ε=63,900, 3,800, 5,000, 5,300, 3,600, 1,100, 2,100, 1,900 and 2,600); infrared absorption at 3.05, 3.40, 3.75–4.10, 6.15, 6.24, 6.34, 6.61, 6.75, 6.82 and 8.05–9.59μ.

EXAMPLE 20

3 - methoxy - 17α - (3 - amino - 1-propynyl)-1,3,5(10)-estratrien-17β-ol [VII; X' is $H_2$, n is 1, R is $C\equiv CCH_2NH_2$, R' is $CH_3$] was prepared from 2.84 g. of estrone methyl ether, 3.02 g. of propargylamine hydrochloride and 1.45 g. of lithium amide according to the procedure described above in Example 12.

EXAMPLE 21

3,3 - ethylenedioxy-17α-(3-dimethylamino-1-propynyl)-5β-androstan-17β-ol [V; X is ethylenedioxy, X' is $H_2$, Y is $CH_3$, n is 1, R is $C\equiv CCH_2N(CH_3)_2$] was prepared from 50.0 g. of 3,3-ethylenedioxy-5β-androstan-17-one, 40.3 g. of 3-dimethylamino-1-propyne and 10.35 g. of lithium amide according to the procedure described above in Example 17. The product was chromatographed on silica gel and recrystallized from acetonitrile to give 3,3-ethylenedioxy - 17α - (3-dimethylamino-1-propynyl)-5β-androstan-17β-ol in the form of colorless rods, M.P. 145.6–147.0° C. (corr.), $[\alpha]_D^{25} = -23.4°$ (1% in chloroform).

3,3 - ethylenedioxy-17α-(3-dimethylamino-1-propynyl)-5β-androstan-17β-ol when warmed with dilute acetic acid is converted to 17α-(3-dimethylamino-1-propynyl)-5β-androstan-17β-ol-3-one [V; X is O, X' is $H_2$, Y is $CH_3$, n is 1, R is $C\equiv CCH_2N(CH_3)_2$].

EXAMPLE 22

3 - methoxy - 17α-[3-(4-methyl-1-piperazinyl)-1-propynyl]-1,3,5(10)-estratrien-17β-ol [VII; X' is $H_2$, n is 1, R is $C\equiv CH_2N(CH_2CH_2)_2NCH_3$, R' is $CH_3$] was prepared from 8.53 g. of estrone methyl ether, 8.71 g. of 3-(4-methyl-1-piperazinyl)-1-propyne (B.P. 190–191° C., from propargyl bromide and 1-methylpiperazine) and 1.38 g. of lithium amide according to the procedure given above in Example 17. The compound was obtained in the form of colorless needles, M.P. 130.2–131.2° C. (corr.) when recrystallized from acetonitrile, $[\alpha]_D^{25} = -3.3°$ (1% in chloroform).

3 - methoxy - 17α-[3-(4-methyl-1-piperazinyl)-1-propynyl]-1,3,5(10)-estratrien-17β-ol was found to be active as an estrogen at 30 mg./kg. and also as a hypocholesteremic agent.

EXAMPLE 23

3 - methoxy - 17α - (3 - methylamino-1-propynyl)-1,3,5 (10)-estratrien-17β-ol [VII; X' is $H_2$, n is 1, R is $$C\equiv CCH_2NHCH_3$$

R' is $CH_3$] was prepared. It was recrystallized from acetone and obtained in the form of colorless blades, M.P. 146.0–147.0° C., $[\alpha]_D^{25} = -5.5°$ (1% in chloroform).

EXAMPLE 24

3 - methoxy - 17α-[3-(N-methylacetylamino)-1-propynyl]-1,3,5(10)-estratrien-17β-ol [VII; X' is $H_2$, n is 1, R is $C\equiv CCH_2N(CH_3)COCH_3$, R' is $CH_3$].

A mixture of 4.26 g. of 3-methoxy-17α-(3-methylamino-1-propynyl)-1,3,5(10)-estratrien-17β-ol (Example 23), 5 ml. of acetic anhydride and 10 ml. of pyridine was allowed to stand overnight and then added to 400 ml. of water. The product was collected by filtration, washed with water and dissolved in 300 ml. of ethyl acetate. The latter solution was dried over anhydrous magnesium sulfate and concentrated to dryness. The residue was recrystallized from acetonitrile to give 3-methoxy-17α-[3-(N-methylacetylamino) - 1 - propynyl]-1,3,5(10)-estratrien-17β-ol in the form of colorless rods, M.P. 166.0–167.6° C. (corr.), $[\alpha]_D^{25} = -1.5°$ (1% in chloroform).

According to the procedures described hereinabove, the steroids listed in the left hand column of the following table can be caused to react with a metal derivative of 3-methylamino-1-propyne to yield products of the invention listed in the right hand column.

| Starting Material | Product |
| --- | --- |
| 1-methylestrone | 1-methyl-17α-(3-dimethylamino-1-propynyl)-1,3,5(10)-estratriene-3-17β-diol. |
| Equilin | 17α-(3-dimethylamino-1-propynyl)-1,3,5(10), 7-estratetraene-3,17β-diol. |
| 14-hydroxyequilenin | 14-hydroxy-17α-(3-dimethylamino-1-propynyl)-1,3,5(10),6,8-estrapentaene-3,17β-diol. |
| Estrone | 17α-(3-dimethylamino-1-propynyl)-1,3-5(10)-estratriene-3,17β-diol. |
| 11-oxoestrone | 17α-(3-dimethylamino-1-propynyl)-1-3,5(10)-estratriene-3,17β-diol-11-one. |
| 5β-androstan-3α-ol-11,17-dione | 17α-(3-dimethylamino-1-propynyl)-5β-androstane-3α,17β-diol-11-one. |
| 3α-acetoxy-1α-hydroxy-5-androsten-17-one | 17α-(3-dimethylamino-1-propynyl)-5-androstene-1α,3α,17β-triol. |
| 3-ethoxy-3,5-androstadien-17-one | 3-ethoxy-17α-(3-dimethylamino-1-propynyl)-3,5-androstadien-17β-ol. |
| 3-ethoxy-19-nor-3,5-androstadien-17-one | 3-ethoxy-17α-(3-dimethylamino-1-propynyl)-19-nor-3,5-androstadien-17β-ol. |
| 3-ethoxy-3,5-androstadien-11β-ol-17-one | 3-ethoxy-17α-(3-dimethylamino-1-propynyl)-3,5-androstadiene-11β,17β-diol. |
| 3α-methyl-5α-androstan-3β-ol-17-one | 3α-methyl-17α-(3-dimethylamino-1-propynyl)-5α-androstane-3β,17β-diol. |

| Starting Material | Product |
|---|---|
| 3α,12α-diacetoxy-5β-androstan-17-one. | 17α-(3-dimethylamino-1-propynyl)5β-androstane-3α,12α,17β-triol. |
| 3α-mercapto-5-androsten-17-one. | 3α-mercapto-17α-(3-dimethylamino-1-propynyl)-5-androsten-17β-ol. |
| 3α-benzoyloxy-5,7-androstadien-17-one. | 17α-(3-dimethylamino-1-propynyl)-5,7-androstadiene-3α,17β-diol. |
| 3α-hydroxy-9(11)-5β-androsten-17-one. | 17α-(3-dimethylamino-1-propynyl)-9(11)-5β-androstene-3α,17β-diol. |
| 4-androsten-17-one. | 17α-(3-dimethylamino-1-propynyl)-4-androsten-17β-ol. |
| Androstan-5α-ol-17-one. | 17α-(3-dimethylamino-1-propynyl)-androstane-5α,17β-diol. |
| 4,4-dimethyl-5-androstene-3,17-dione 3-monoethylene glycol ketal. | 3,3-ethylenedioxy-4,4-dimethyl-17α-(3-dimethylamino-1-propynyl)-5-androsten-17β-ol. |
| 4-methyl-5-androstene-3,17-dione 3-monoethylene glycol ketal. | 3,3-ethylenedioxy-4-methyl-17α-(3-dimethylamino-1-propynyl)-5-androsten-17β-ol. |
| 19-nor-5α-androstane-3,17-dione 3-monoethylene glycol ketal. | 3,3-ethylenedioxy-17α-(3-dimethylamino-1-propynyl)-19-nor-5α-androstan-17β-ol. |
| 6-hydroxy-3,5-cycloandrostan-17-one. | 17α-(3-dimethylamino-1-propynyl)-3,5-cycloandrostane-6,17β-diol. |
| 3,5-cyclo-6-androsten-17-one. | 17α-(3-dimethylamino-1-propynyl)-3,5-cyclo-6-androsten-17β-ol. |
| D-homoestrone. | 17aα-(3-dimethylamino-1-propynyl)-1,3,5(10)-D-homoestratriene-3,17aβ-diol. |
| D-homo-19-nor-5α-androstan-3β-ol-17-one. | 17aα-(3-dimethylamino-1-propynyl)-D-homo-5α-androstane-3β-17aβ-diol. |
| 19-nor-5α-androstan-17β-ol-3-one. | 3-(3-dimethylamino-1-propynyl)-19-nor-5α-androstane-3,17β-diol. |
| D-homo-19-Nor-5α-androstan-17aβ-ol-3-one. | 3-(3-dimethylamino-1-propynyl)-D-homo-19-nor-5α-androstane-3,17aβ-diol. |
| D-homo-5β-androstan-17aβ-ol-3,11-dione. | 3-(3-dimethylamino-1-propynyl)-D-homo-5β-androstane-3,17aβ-diol-11-one. |
| Pregnane-3,20-dione 20-ethylene glycol ketal. | 3-(3-dimethylamino-1-propynyl)-pregnan-3-ol-20-one 20-ethylene glycol ketal. |
| Pregnan-20β-ol-3-one. | 3-(3-dimethylamino-1-propynyl)-pregnane-3,20β-diol. |
| Pregnane-17α,21-diol-3,11,20-trione 17,20;20,21-bismethylenedioxy derivative. | 3-(3-dimethylamino-1-propynyl)-pregnane-3,17α,21-triol-11,20-dione 17,20;20,21-bismethylene-dioxy derivative. |
| 17α-methyl-5β-androstan-17β-ol-3-one. | 3-(3-dimethylamino-1-propynyl)-17α-methyl-5β-androstane-3,17β-diol. |
| 17α-methyl-19-nor-5α-androstan-17β-ol-3-one. | 3-(3-dimethylamino-1-propynyl)-17α-methyl-19-nor-5α-androstane-3,17β-diol. |
| 17-(3-diethylamino-1-propynyl)-5α-androstan-17-ol-3-one (Example 5). | 3-(3-dimethylamino-1-propynyl)-17-(3-diethylamino-1-propynyl)-5α-androstane-3,17-diol. |
| 17α-ethynyl-5α-androstan-17β-ol-3-one. | 3-(3-dimethylamino-1-propynyl)-17α-ethynyl-5α-androstane-3,17β-diol. |
| 6α,17α-dimethyl-5α-androstan-17β-ol-3-one. | 3-(3-dimethylamino-1-propynyl)-5α-androstane-3,17β-diol. |
| 5α-androstane-6β,17β-diol-3-one. | 3-(-dimethylamino-1-propynyl)-5α-androstane-3,6β,17β-triol. |
| Testosterone. | 3-(3-dimethylamino-1-propynyl)-4-androstene-3,17β-diol. |
| 19-nortestosterone. | 3-(3-dimethylamino-1-propynyl)-19-nor-4-androstene-3,17β-diol. |
| 17-methyltestosterone. | 3-(3-dimethylamino-1-propynyl)-17α-methyl-4-androstene-3,17β-diol. |
| 5α-androstane-3,17-dione. | 3,17-bis(3-dimethylamino-1-propynyl)-5β-androstane-3,17-diol. |
| 5β-androstane-7β,14α-diol-3,17-dione. | 3,17-bis(3-dimethylamino-1-propynyl)-5β-androstane-3,7β,14α,17-tetrol. |
| 5β-androstane-3,11,17-trione. | 3,17-bis(3-dimethylamino-1-propynyl)-5α-androstane-3,17-diol-11-one. |
| D-homo-5β-androstane-3,17a-dione. | 3,17a-bis(3-dimethylamino-1-propynyl)-D-homo-5β-androstane-3,17a-diol. |
| D-homo-5β-androstane-3,11,17a-trione. | 3,17a-bis(3-dimethylamino-1-propynyl)-D-homo-5β-androstane-3,17a-diol-11-one. |

17α-(3-diethylamino-1-propynyl)-4-androsten-17β-ol-3-one (Example 4) can be caused to react with ethyl formate in the presence of sodium hydride to give the 2-hydroxymethylene derivative, and the latter condensed with hydrazine or hydroxylamine to give, respectively, 17α-(3-diethylamino-1-propynyl)-17β-hydroxy-4-androsteno[3,2-c]pyrazole or 17α-(3-diethylamino-1-propynyl)-17β-hydroxy-4-androsteno[2,3-d]isoxazole.

3ξ-(3-diethylamino-1-propynyl)-5β-androstane-3ξ,17β-diol (Example 11) can be oxidized by the Oppenauer method (Example 4) to 3ξ-(3-diethylamino-1-propynyl)-5β-androstan-17β-ol-3-one, which can be caused to react with ethyl formate in the presence of sodium hydride to give the 16-hydroxymethylene derivative and the latter condensed with hydrazine to give 3ξ-(3 - diethylamino - 1 - propynyl)-3ξ-hydroxy-5β-androstano[17,16-c]pyrazole.

We claim:

1. A steroid having a carbon skeleton selected from the group consisting of estrane, androstane, D-homoestrane and D-homoandrostane, having, in the case of the estrane and androstane skeletons, both a hydroxy group and an omega-amino-lower-aliphatic hydrocarbon group in at least one of the 3- and 17- positions, and, in the case of the D-homoestrane and D-homoandrostane skeletons, both a hydroxy group and an omega-amino-lower-aliphatic hydrocarbon group in at least one of the 3- and 17α-positions; wherein the steroid moiety has from eighteen to twenty-three carbon atoms exclusive of ester radicals and of the omega-amino-lower-aliphatic hydrocarbon group; and wherein the omega-amino-lower-aliphatic hydrocarbon group is a member of the group consisting of omega-amino-1-lower-alkynyl, omega-amino - 1 - lower-alkenyl and omega-amino-lower alkyl, wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino.

2. 17-(omega-di-lower-alkylamino - 1 - lower-alkynyl)-5-androstene-3β,17-diol.

3. 17-(omega-di-lower-alkylamino - 1 - lower-alkynyl)-5α-androstane-3β,17-diol.

4. 17-(omega-di-lower-alkylamino-lower-alkyl) - 5α - androstane-3β,17-diol.

5. 17-(omega-di-lower-alkylamino - 1 - lower alkynyl)-4-androsten-17-ol-3-one.

6. 17-(omega-di-lower-alkylamino - 1 - lower-alkynyl)-5α-androstan-17-ol-3-one.

7. 3 - lower-alkoxy-17α-(omega-di-lower-alkylamino-1-lower-alkynyl)-1,3,5(10)-estratrien-17β-ol.

8. 3-methoxy-17α-(3-dimethylamino - 1 - propynyl)-1,3,5(10)-estratrien-17β-ol.

9. 3-lower-alkoxy - 17α - (omega-di-lower-alkylamino-lower-alkyl)-1,3,5(10)-estratrien-17β-ol.

10. 3-lower-alkoxy - 17α-(omega-di-lower-alkylamino-1-lower-alkenyl)-1,3,5(10)-estratrien-17β-ol.

11. 3α-lower-alkanoyloxy - 17α - (omega-di-lower-alkylamino - 1 - lower-alkynyl)-D-homo-5β-androstan-17α-ol-11-one.

12. 3-(omega-di-lower-alkylamino - 1 - lower-alkynyl)-5β-androstane-3,17β-diol.

13. 3 - (omega-di-lower-alkylamino-lower-alkyl) - 5β-androstane-3,17β-diol.

14. 17α-lower-alkyl - 3 - (omega-di-lower-alkylamino-1-lower-alkynyl)-5β-androstane-3,17β-diol.

15. 17α-lower-alkyl - 3 - (omega-di-lower-alkylamino-1-lower-alkenyl)-5β-androstane-3,17β-diol.

16. 17α-lower-alkyl - 3 - (omega-di-lower-alkylamino-lower-alkyl)-5β-androstane-3,17β-diol.

17. 17α - (omega-di-lower-alkylamino-lower-alkyl)-D-homo-5β-androstane-3α,17α-diol-11-one.

18. 3-lower-alkoxy - 17α-(omega-di-lower-alkylamino-1-lower-alkynyl)-1,3,5(10),6-estratetraen-17β-ol.

19. 3-lower-alkoxy - 17α-(omega-di-lower-alkylamino-1-lower-alkynyl)-1,3,5(10),6,8-estrapentaen-17β-ol.

20. 3,3-lower-alkylenedioxy - 17α - (omega-di-lower-alkylamino-1-lower-alkynyl)-5β-androstan-17β-ol.

21. 3-lower-alkoxy-17α[3-(4-methyl - 1 - piperazinyl)-1-propynyl]-1,3,5(10)-estratrien-17β-ol.

22. 3-lower-alkoxy - 17α-(omega-lower-alkylamino-1-lower-alkynyl)-1,3,5(10)-estratrien-17β-ol.

23. 3 - lower-alkoxy - 17α - [omega-(N-lower-alkyl-lower-alkanoylamino) - 1 - lower-alkynyl]-1,3,5(10)-estratrien-17β-ol.

24. The process which comprises reacting a member of the group consisting of 3-oxo-steroids, 17-oxo-steroids, 3-oxo-D-homosteroids, 17α-oxo-D-homosteroids, 3,17-dioxo-steroids and 3,17α - dioxo-D-homosteroids, having from eighteen to twenty-three carbon atoms exclusive of ester radicals and having a carbon skeleton selected from the group consisting of estrane, androstane, D-homoestrane and D-homoandrostane, with a member of the group consisting of alkali and alkaline earth metal derivatives of an omega-amino - 1 - alkyne, wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino.

25. A compound selected from the group consisting of those having one of the structural formulae:

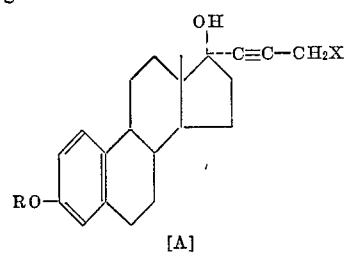

[A]

and

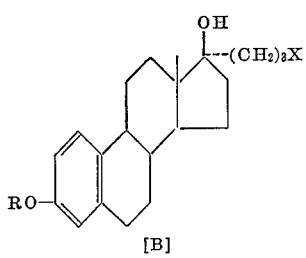

[B]

wherein R represents lower alkyl, and X represents an amino substituent selected from the group consisting of dilower-alkylamino, morpholino, piperidino, pyrrolidino, and N-alkylpiperazino.

26. A compound according to claim 25 having the A structure wherein the R is a lower alkyl group and X is a diloweralkylamino group.

27. A compound according to claim 26 wherein the lower alkyl group is methyl.

28. A compound according to claim 25 having the B structure wherein R is a lower alkyl group and X is a diloweralkylamino group.

29. A compound according to claim 28 wherein the lower alkyl group is methyl.

30. 17α - aminoalkyl - 3-(lower)alkoxyestra-1,3,5(10)-trien-17-ol.

31. A compound selected from the group consisting of (A) compounds of the formula

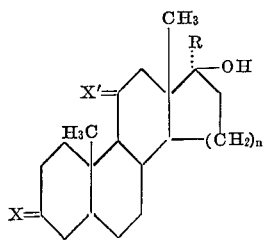

wherein X is selected from the group consisting of O, (α-OH)(H), (β-OH)(H) and lower-alkylenedioxy; X' is selected from the group consisting of $H_2$, O, (α-OH)(H) and (β-OH)(H); $n$ is an integer from 1 to 2; and R is a member of the group consisting of omega-amino-1-lower-alkynl, omega-amino-1-lower-alkenyl and omega-amino-lower-alkyl, wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino; (B) compounds of the above formula having a double bond in the 4,5-position, X being O; (C) compounds of the above formula having a double bond in the 5,6-position, X being (OH)(H) or lower-alkylenedioxy; and (D) esters of the foregoing compounds, said esters being derived from carboxylic acids having from 1 to 10 carbon atoms and a molecular weight less than 200.

32. A compound selected from the group consisting of (A) compounds of the formula

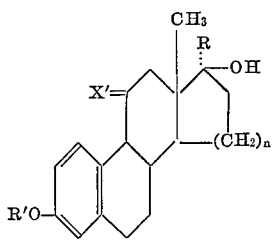

wherein X' is selected from the group consisting of $H_2$, O, (α-OH)(H) and (β-OH)(H); $n$ is an integer from 1 to 2; R' is a member of the group consisting of hydrogen and lower-alkyl; and R is a member of the group consisting of omega-amino-1-lower-alkynyl, omega-amino-1-lower-alkenyl and omega-amino-lower-alkyl wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino; (B) compounds of the above formula having a double bond in the 6,7-positions; (C) compounds of the above formula having double bonds in the 6,7- and 8,9-positions; and (D) esters of the foregoing compounds, said esters being derived from carboxylic acids having from 1 to 10 carbon atoms and a molecular weight less than 200.

33. A compound selected from the group consisting of (A) compounds of the formula

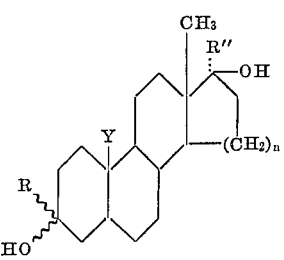

wherein $n$ is an integer from 1 to 2; R'' is a member of the group consisting of hydrogen and lower-alkyl; Y is a member of the group consisting of hydrogen and methyl; and R is a member of the group consisting of omegaamino-1-lower-alkynyl, omega-amino-1-lower-alkenyl and omega-amino-lower-alkyl, wherein the omega-amino group is of the formula NZZ', wherein Z is a member of the group consisting of hydrogen, lower-alkyl, cycloalkyl of 5–6 ring members and phenyl-lower-alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino; (B) compounds of the above formula having a double bond in the 4,5-position; and (C) esters of the foregoing compounds, said esters being derived from carboxylic acids having from 1 to 10 carbon atoms and a molecular weight less than 200.

34. A compound selected from the group consisting of (A) compounds of the formula

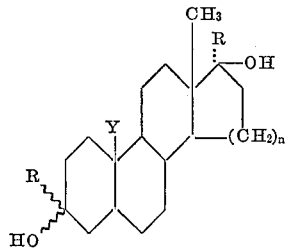

wherein $n$ is an integer from 1 to 2; Y is a member of the group consisting of hydrogen and methyl; and R is a member of the group consisting of omega-amino-1-lower-alkynyl, omega-amino-1-lower-alkenyl and omega-amino-lower-alkyl, wherein the omega-amino group is of the formula NZZ', wherein Z is a member of the group consisting of hydrogen, lower-alkyl, cycloalkyl of 5–6 ring members and phenyl-lower alkyl, and Z' is a member of the group consisting of hydrogen, lower-alkyl, lower-alkanoyl, cycloalkyl of 5–6 ring members and phenyl-lower-alkyl, including compounds wherein NZZ' together is a member of the group consisting of piperidino, pyrrolidino, hexamethylenimino, morpholino, piperazino, and lower-alkylated piperidino, pyrrolidino, hexamethylenimino, morpholino and piperazino; and (B) compounds of the above formula having a double bond in the 4,5-position.

35. 17α-aminoalkynl-3-(lower)-alkoxyestra - 1,3,5(10)-trien-17β-ol.

No references cited.

ELBERT L. ROBERTS, Primary Examiner

U.S. Cl. X.R.

260—239.55, 397.4, 397.5, 488, 584, 397.45

PO-1050
(5/69)

UNITED STATES PATENT OFFICE
CERTIFICATE OF CORRECTION

Patent No. 3,522,243      Dated July 28, 1970

Inventor(s) Robert G. Christiansen and Raymond O. Clinton

It is certified that error appears in the above-identified patent and that said Letters Patent are hereby corrected as shown below:

Column 2, line 62, "phenylacetayl" should read --phenylacetyl--.

Column 10, line 71, "17α-ol" should read --17β-ol--.

Column 11, line 32, "1-propynyl)-" should read --1-propyl)- --.

Column 13, line 55, "-ξ-ol" should read -- -3ξ-ol--.

Column 14, line 56, "3a,17aβ" should read --3α,17aβ--.

Column 15, line 25, "6-dehydrostrone" should read --6-dehydroestrone--; line 36, "3,5(10)-" should read --3,5(10),6- --.

Column 17 (Table, 29th Product), "5β" should read --5α--.

Column 17, in Table between 29th and 30th Starting Material, insert: --5β-Androstane-3,17-dione-- and between 29th and 30th Product, insert: --3,17-Bis(3-dimethylamino-1-propynyl)-5β-androstane-3,17-diol--.

Column 17 (Table, 31st Starting Material), "5β-" should read --5α- --.

Column 18, line 16, Claim 1, "17α-" should read --17a- --; line 52, Claim 11, "17α-" should read --17a- --; lines 64 and 65, Claim 17, "17α-" should read --17a- --, both occurrences.

Column 19, lines 5 and 6, Claim 24, "17α-" should read --17a- --, both occurrences.

Column 20, line 5, Claim 31, "alkynl" should read --alkynyl--; line 54, Claim 32, "6,7-positions" should read --6,7-position--.

Column 22, line 18, Claim 35, "aminoalkynl" should read --aminoalkynyl--.

Signed and sealed this 24th day of August 1971.

(SEAL)
Attest:

EDWARD M. FLETCHER, JR.
Attesting Officer

WILLIAM E. SCHUYLER, JR.
Commissioner of Patents